J. A. GERHART.
VEHICLE WHEEL TIRE.
APPLICATION FILED OCT. 12, 1911.
1,037,753.
Patented Sept. 3, 1912.
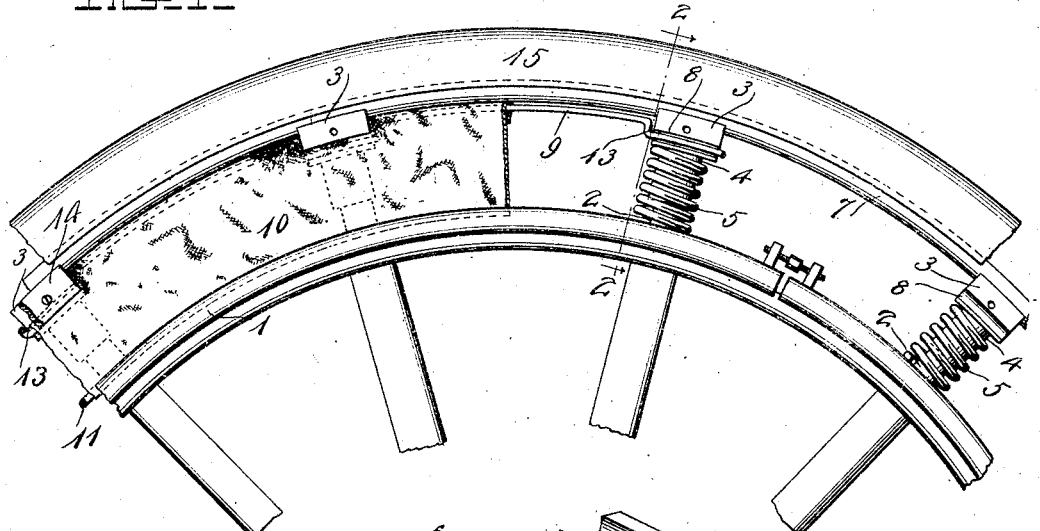
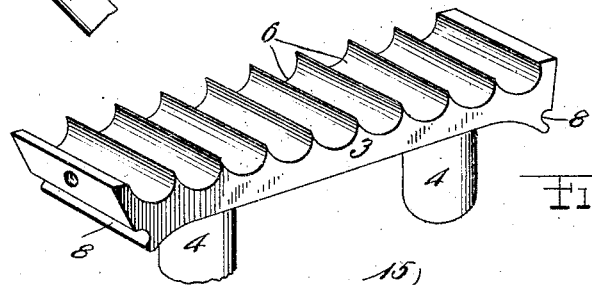
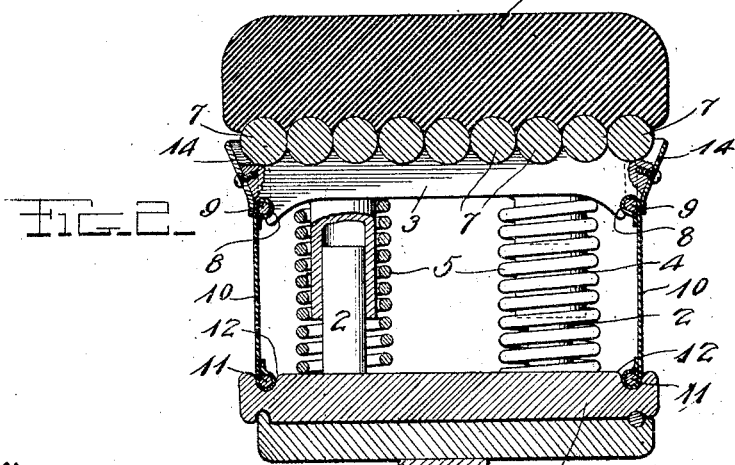
Witnesses
J. R. Pierce
S. M. McColl
Inventor
J. A. Gerhart
by H. B. Willson & Co.
Attorneys

UNITED STATES PATENT OFFICE.

JOHN A. GERHART, OF MARIETTA, OHIO.

VEHICLE WHEEL-TIRE.

1,037,753.  Specification of Letters Patent.  Patented Sept. 3, 1912.

Application filed October 12, 1911. Serial No. 654,382.

*To all whom it may concern:*

Be it known that I, JOHN A. GERHART, a citizen of the United States, residing at Marietta, in the county of Washington and State of Ohio, have invented certain new and useful Improvements in Vehicle Wheel-Tires; and I do declare the following to be a full, clear, and exact description of the invention, such as will enable others skilled in the art to which it appertains to make and use the same.

This invention relates to improvements in tires for vehicle wheels.

The object of the invention is to provide a resilient tire designed to replace pneumatic tires and which while affording ample resiliency is not subject to puncture which renders the pneumatic tire objectionable.

With this and other objects in view the invention consists of certain novel features of construction, combination and the arrangement of parts as will hereinafter be more particularly described and afterward specifically claimed.

In the accompanying drawings: Figure 1 represents a side elevation with parts broken out of a portion of a vehicle wheel equipped with this improved tire; Fig. 2 is a transverse section taken on the line 2—2 of Fig. 1; Fig. 3 is a perspective view of a ring saddle.

In the embodiment illustrated, a flat rim is shown, such as is ordinarily used on motor vehicles and which is secured to the wheel spokes in any suitable or desired manner, and to which is removably applied an auxiliary rim 1. Arranged at suitable intervals on the periphery of this rim 1 are groups or series of posts or studs as 2 a group of said studs being preferably disposed over each of the wheel spokes, as shown in Fig. 1. Any desired number of posts may be employed in each group and the posts of the respective groups are arranged transversely of the rim 1 in alinement with each other and spaced a suitable distance apart to support the outer rim to be described. Two posts are here shown in each group, but it will be understood that more may be used according to the width of the rim and the weight of the vehicle to which the tire is to be applied.

An outer rim is yieldably supported on the studs 2 and comprises a plurality of peripherally spaced ring saddles 3 connected by a plurality of peripherally arranged rings, as will be hereinafter more specifically described.

Arranged over each series of studs or posts 2 is a ring saddle 3 of any suitable width and of a length corresponding to the width of the rim 1, the opposite ends of these saddles being preferably beveled or inclined downwardly and inwardly as shown clearly in Figs. 2 and 3. These saddles 3 are provided on their lower or inner faces with tubular socket members 4 positioned to slidably engage the posts 2 of the rim 1 when the parts are assembled (see Fig. 2). Coiled springs 5 of suitable strength encircle said posts and sockets and bear at their opposite ends against the rim 1 and the saddles 3, exerting their tension to force and hold said saddles away from said rim, affording a resilient connection between them.

Each of the saddles 3 is provided on its outer face with a plurality of transversely extending grooves 6 which form seats for the spring metal rings 7 which extend peripherally around the wheel and form a resilient support for a solid rubber tire 15 mounted thereon as will be hereinafter described. These grooves 6 are arranged in close proximity to receive and support the rings 7 and hold them in close relation, the side walls of the grooves holding said rings against lateral movement. Any desired number of these rings 7 may be employed according to the size thereof and the weight of the vehicle to be supported. These rings are preferably constructed of spring steel rods, having their ends welded together.

The saddles 3 are provided at their opposite ends near their lower edges with transversely extending grooves as 8 which are designed to receive the upper rings 9 of dust guards 10 which are connected at their other ends with the rim 1 by means of inner rings 11 which fit in grooves 12 in said rim (see Fig. 2). These dust guards 10 are composed of any suitable flexible material, preferably of canvas and serve to protect the socket members and posts with the springs mounted thereon and prevent them from becoming clogged with dust or mud which would interfere with their operation. The upper rings 9 of the dust guards are bent at intervals to provide offsets 13 which are adapted to fit around the ends of the saddles 3, as shown clearly in Fig. 1. Plates 14 are secured to the ends of the saddles 3 by screws or other suitable fastenings, and the lateral edges thereof extend over the upper rings 9 of the dust guards and hold them securely connected with said saddles.

The solid rubber tire 15 may be of any desired thickness and shape and is held securely in position on the outer rim by the tension of the springs 5, and against lateral movement by the peripheral grooves in the inner face of said tire 15, which engage the rings 7.

In the assembling of the parts of the tire, the springs 5 are placed on the socket members 4 and said socket members slidably engaged with the posts 2. Clamps are then placed on the saddles and rim 1 to force the saddles inwardly against the tension of the springs 5 and when so held, the rings 7 may be quickly and easily seated in the grooves 6 of said saddles. The rim 15 is then placed on the rings 7 and the rim 1 will be ready to slip on the permanent rim of the wheel. When the clamps are removed, the springs 5 will immediately expand to force said saddles outwardly and securely hold the rings 7 against accidental displacement, and secure engagement with the tread member 15. It will thus be obvious that when the wheel passes over an obstruction, the springs 7 and 5 will yield in the same manner as does a pneumatic tire.

The tire is especially designed to be used with any wheel and may be readily substituted for a pneumatic tire when desired.

From the foregoing description taken in connection with the accompanying drawings, the construction and operation of my invention will be readily understood without requiring a more extended explanation.

Various changes in the form, proportion and the minor details of construction may be resorted to within the scope of the claim without departing from or exceeding the spirit of the claimed invention.

I claim as my invention:

A vehicle tire comprising a rim having peripheral grooves in its outer face near its opposite edges, ring saddles resiliently mounted on said rim transversely of the tire and inclined downwardly and inwardly and having grooves at their lower edges, a plurality of rings mounted on said saddles, means for holding said rings on said saddles, a tread element engaged with said rings, flexible dust guards arranged at opposite sides of said tire and having securing rings at their opposite edges for engagement with the grooves in said saddles and rim, the outer guard securing ring having offsets to fit around the ends of the saddles and provide for the close fitting of the guard at the sides of the tire, and plates secured to the ends of the saddle with their inner edges overlapping the outer rings of said guard.

In testimony whereof I have hereunto set my hand in presence of two subscribing witnesses.

JOHN A. GERHART.

Witnesses:
 GEORGE O. SALZMAN,
 ARCH. A. SCHRAMM.

---

Copies of this patent may be obtained for five cents each, by addressing the "Commissioner of Patents, Washington, D. C."